United States Patent [19]

Hosaka et al.

[11] 4,391,864
[45] Jul. 5, 1983

[54] MAGNETIC RECORDING MEDIUM

[75] Inventors: Akihiko Hosaka; Kiyotaka Okuyama; Yukihiro Isobe, all of Tokyo, Japan

[73] Assignee: TDK Electronics Co., Ltd., Tokyo, Japan

[21] Appl. No.: 214,677

[22] Filed: Dec. 9, 1980

[30] Foreign Application Priority Data

Mar. 21, 1980 [JP] Japan .................................. 55-35947

[51] Int. Cl.³ ............................................. G11B 5/70
[52] U.S. Cl. ...................................... 428/64; 360/134; 360/135; 252/62.54; 427/128; 428/413; 428/425.9; 428/694; 428/900
[58] Field of Search ............ 428/900, 694, 695, 425.9, 428/64, 413; 427/128; 252/62.54; 360/134, 135, 136

[56] References Cited

U.S. PATENT DOCUMENTS

| | | | |
|---|---|---|---|
| 3,057,809 | 10/1962 | Newey | 521/180 |
| 3,320,090 | 5/1967 | Graubart | 428/425.9 |
| 3,911,196 | 10/1975 | Navidad | 428/329 |
| 4,115,290 | 9/1978 | Kubota et al. | 252/62.54 |
| 4,172,176 | 10/1979 | Tanaka et al. | 428/411 |

Primary Examiner—Stanley S. Silverman
Attorney, Agent, or Firm—Oblon, Fisher, Spivak, McClelland & Maier

[57] ABSTRACT

A magnetic recording tape or disc which has excellent total characteristics of an adhesive strength, a repeat running durability, an electromagnetic characteristic, a gloss degree of the surface and a curling is provided. A binder of a magnetic layer comprises 40 to 70 wt. % of a urethane resin, 15 to 40 wt. % of an epoxy resin and 10 to 40 wt. % of a phenoxy resin.

5 Claims, 1 Drawing Figure

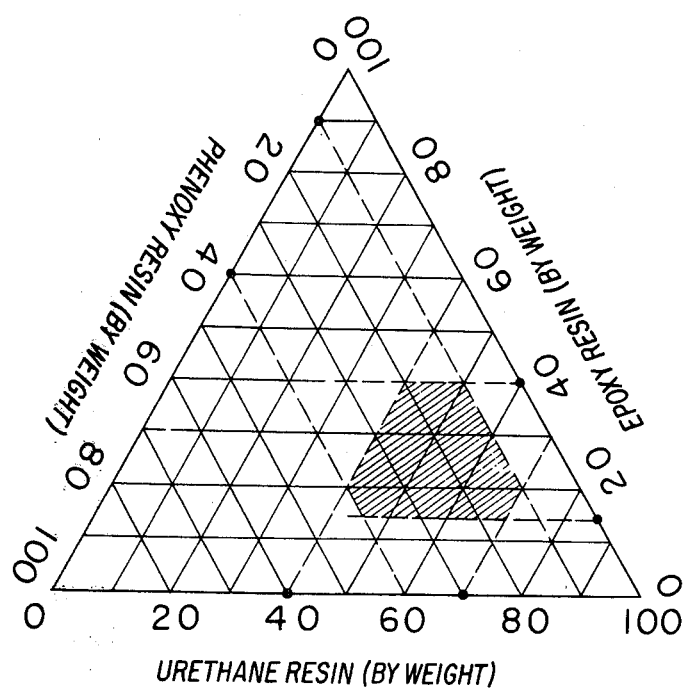

MAGNETIC RECORDING MEDIUM

BACKGROUND OF THE INVENTION

1. Field of the Invention

The present invention relates to a magnetic recording medium. More particularly, it relates to a magnetic recording medium having both characteristics of excellent electromagnetic transfer characteristics and excellent physical characteristic.

2. Description of the Prior Art

Magnetic recording media prepared by coating a magnetic composition comprising a magnetic powder and a resin binder on a substrate have been mainly used. In view of expansion of the fields for application, magnetic recording media having further superior functions have been required.

The conventional binders used for the purpose are mainly combinations of two components of a resin component and a rubber component such as vinyl chloride-vinylidene chloride type copolymer, vinyl chloride-vinyl acetate type copolymer, acrylonitrile type, cellulose type, urethane type, ester type, ethylene type, epoxy type and phenoxy type resins. The combination of polyurethane and vinyl chloride-vinyl acetate copolymer or the combination of polyurethane and nitrocellulose has been mainly used as the binder. Thus, the two component type binders have not been satisfactory to impart both of satisfactory electromagnetic transfer characteristic and physical characteristic because the optimum ratios of the two components for the electromagnetic transfer characteristic or the physical characteristic are different. Both of satisfactory characteristics have not been disadvantageously attained.

SUMMARY OF THE INVENTION

It is an object of the present invention to provide a magnetic recording medium which has excellent electromagnetic transfer characteristic as the important and indispensable characteristics for a magnetic recording medium and excellent physical characteristics especially repeat running durability and adhesive strength without deterioration of surface smoothness.

The foregoing and other objects of the present invention have been attained by providing a magnetic recording medium having a substrate coated with a magnetic layer comprising a magnetic powder and a binder comprising three components of an urethane resin, an epoxy resin and a phenoxy resin, especially 40 to 70 wt. % of the urethane resin, 15 to 40 wt. % of the epoxy resin and 10 to 40 wt. % of the phenoxy resin.

BRIEF DESCRIPTION OF THE DRAWING

The FIGURE is a triangular coordinate of three components used as the binder in the preparation of the magnetic recording medium of the present invention.

DETAILED DESCRIPTION OF THE PREFERRED EMBODIMENTS

In accordance with the present invention, both of the electromagnetic transfer characteristic and the physical characteristics of the repeat running durability (durability in repeat runnings) and the adhesive strength which are indispensable for the magnetic recording medium have been satisfactorily given and the surface smoothness which contradicts to said characteristics is not deteriorated so that a magnetic recording medium having satisfactory total characteristics can be obtained.

In accordance with the present invention using the combination of three components of the urethane resin, the epoxy resin and the phenoxy resin as the binder in the magnetic composition used for the magnetic recording medium, the magnetic recording medium having excellent characteristics of repeat running durability, adhesive strength, electromagnetic transfer characteristic and glossness in total in comparison with the conventional two component type binder.

As described above, in the present invention, the binder of the magnetic paint comprises three components of an urethane resin, an epoxy resin and a phenoxy resin.

The urethane resins are reaction products obtained by reacting a diisocyanate with a compound having hydroxyl group e.g. a glycol. It is preferable to use the urethane resin having terminal hydroxyl groups.

The urethane resins are described in Encyclopedia of Polymer Science and Technology. The typical urethane resins include toluenediisocyanate type urethanes (TDI); diphenylmethanediisocyanate type urethanes (MDI); and hexamethylenediisocyanate type urethanes (HDI); (Nippolan 5032) which are commercially available as Nippolan 5033, 5032 and 2304 (Nippon Polyurethane K.K.) and Estene 5702 and 5703 (Goodrich Co. Ltd.) etc.

The phenoxy resins are described in Encyclopedia of Polymer Science and Technology and said phenoxy resins are characterized by being thermoplastic and by their content of polyhydroxyether groups. They are commercially available as PKHH, PKHC and PKHA (UCC Co. Ltd.)

The epoxy resins are condensed products obtained by condensing an epoxy compound with a compound having a reactive hydrogen atom. The epoxy resins are described in Encyclopedia of Polymer Science and Technology and said epoxy resins are characterized by being thermosetting and by their content of epoxide groups.

The typical epoxy resins include bisphenol type epoxy resins (methylepichlorohydrin+bisphenol A): liquid type: (Epicoat 801, 807, 808 (Shell Chem. Co., Ltd.); solid type: (Epicoat 1001, 1002, 1003, 1004, 1007 and 1009 (Shell)); ether ester type epoxy resins: (methyl epichlorohydrin+bisphenol A+dicarboxylic acid): (Epicoat OL-53-B40); ester type epoxy resins (methyl epichlorohydrin+polycarboxylic acid); (Epicoat 190 (Shell)); novolack type epoxy resins (methyl epichlorohydrin+novolack); (Epicoat 152 and 154 (Shell)); and non-flammable type epoxy resin (methyl epichlorohydrin+brominated bisphenol A); (Epicoat 1045 (Shell)).

The typical epoxy resins are commercially available as Epicoat 1004, 1007 and 1009 (Shell Chem. Co. Ltd.).

In the present invention, the three components are combined at specific ratios which are defined in the triangular coordinate of the three components as the hatched region in FIG. 1.

That is, the binder comprises 40 to 70 wt. % of the urethane resin 15 to 40 wt. % of the epoxy resin and 10 to 40 wt. % of the phenoxy resin.

For example, when a content of the urethane resin is less than 40 wt. %, the surface characteristic and the adhesive strength are inferior whereas when it is higher than 70 wt. %, the adhesive strength is enough high, but the coefficient of friction is high and the repeated running durability is inferior.

When a content of the epoxy resin is less than 15 wt. %, the coated substrate is curled in the drying step whereby it causes inferior head touch to cause disadvantageous output fluctuation as the magnetic recording tape, whereas when it is more than 40 wt. %, the repeat running durability is inferior though the dispersibility in the magnetic composition is slightly superior.

When a content of the phenoxy resin is less than 10 wt. %, the repeat running durability is inferior whereas when it is more than 40 wt. %, the dispersibility in the magnetic composition is inferior whereby the surface characteristic is not improved and the electromagnetic transfer characteristic is inferior.

The three component type binder is admixed with a magnetic powder and additives used for the preparation of magnetic recording media such as a dispersing agent, a lubricant, a curing agent and a solvent to prepare a magnetic composition.

The preparation of the magnetic composition and the preparation of the magnetic recording medium by coating the magnetic composition are attained by the conventional technology. The condition are well known in this field and accordingly, they are not repeated in this specification.

The magnetic recording media such as the magnetic recording tapes prepared by utilizing the characteristics of the three component type binder of the present invention have remarkably excellent electromagnetic transfer characteristic as well as physical characteristics as described below.

The present invention will be further illustrated by certain examples and references which are provided for purposes of illustration only and are not intended to be limiting the present invention.

EXAMPLE 1

| | |
|---|---|
| α-Fe$_2$O$_3$ (cobalt doped) | 400 wt. parts |
| Dispersing agent (lecithin) | 8 wt. parts |
| Urethane resin (Nippolan 5033 manufactured by Nippon Polyurethane) | 50 wt. parts |
| Epoxy resin (Epicoat 1007 manufactured by Shell Chem. Co. Ltd.) | 30 wt. parts |
| Phenoxy resin (PKHC manufactured by UCC Co. Ltd.) | 20 wt. parts |
| Lubricant | 6 wt. parts |
| Methyl ethyl ketone | 500 wt. parts |
| Methyl isobutyl ketone | 250 wt. parts |
| Cyclohexanone | 150 wt. parts |

The components were charged in a ball mill and mixed to disperse them completely and then, 15 wt. parts of a curing agent of polyisocyanate (Colonate L manufactured by Nippon Polyurethane K.K.) was admixed uniformly to prepare a coating dispersion. The coating dispersion was coated in a thickness of 6μ (in dry) on a polyester film having a thickness of 12μ. The surface of the dried coated film was treated by a supercalender as a surface processing and the binder was cured at 60° C. for 40 hours. The product was cut into tapes having a width of 3.81 mm to prepare audio magnetic recording tapes.

EXAMPLE 2

In accordance with the process of Example 1 except varying the ratios of the urethane resin, the epoxy resin and the phenoxy resin, each of audio magnetic recording tapes was prepared.

The adhesive strength, the repeated running durability repeatability, the electromagnetic transfer characteristic and the surface smoothness (gloss degree) and degree of curling of the resultant audio magnetic recording tape were measured. The compositions of the binders used for the preparation of the magnetic recording tapes and the results of the characteristics are shown in Table.

TABLE

| Sample No. | A | B | C | D | E |
|---|---|---|---|---|---|
| Binder: | | | | | |
| Urethane resin | 60 | 70 | 45 | 50 | 50 |
| Epoxy resin | 15 | 20 | 15 | — | 50 |
| Phenoxy resin | 25 | 10 | 40 | 50 | — |
| Characteristics: | | | | | |
| Adhesive strength (g) | 50 | 65 | 45 | 95 | 35 |
| Repeatability (times) | 1150 | 1100 | 1250 | 500 | 200 |
| Electromagnetic transfer characteristic 10KHz (dB) | +0.4 | +0.9 | 0 | −1.7 | +0.3 |
| Gloss degree (dB) | +0.7 | +1.5 | +0.1 | −1.5 | +0.5 |
| Curling | ○ | ○ | △ | X | ○ |

| Sample No. | F | G | H | I |
|---|---|---|---|---|
| Binder: | | | | |
| Urethane resin | 70 | 30 | 40 | 50 |
| Epoxy resin | — | — | 40 | 30 |
| Phenoxy resin | 30 | 70 | 20 | 20 |
| Characteristics: | | | | |
| Adhesive strength (g) | 105 | 20 | 55 | 60 |
| Repeatability (times) | 150 | 650 | 970 | 1200 |
| Electromagnetic transfer characteristic 10KHz (dB) | +0.3 | −0.8 | +0.1 | 0 |
| Gloss degree (dB) | +0.7 | −1.1 | 0 | 0 |
| Curling | ○ | X | ○ | ○ |

In Table 1, the adhesive strength means the peeling strength between the magnetic coated membrane and the base film in the direction of 180 degree and is shown by the unit of gram per ⅛ inch. (3.81 mm).

The electromagnetic transfer characteristic and the gloss degree (measured by a glossmeter "GH-5" manufactured by Murakami Shikisai K.K.) are shown by relative values as those of Sample I being 0 dB.

As it is found in Table 1, all of the adhesive strength, the repeat running durability, the electromagnetic transfer characteristic, the gloss degree and the curling of Samples A, B, C, H and I in the range of the present invention are excellent and the samples are the magnetic recording tapes having excellent total characteristics.

On the other hand, Samples D, E, F and G which are out of the range of the present invention have certain excellent characteristics but have certain inferior characteristics which cause a trouble as the total characteristics in a practical use.

A content of the curing agent is preferably in a range of 8 to 20 wt. parts based on 100 wt. parts of the binder. When it is less than 8 wt. parts, the crosslinking effect is not satisfactory whereas when it is more than 20 wt. parts, the adhesive strength between the coated membrane and the base film is inferior.

As described above, the magnetic recording medium of the present invention has excellent total characteristics of the adhesive strength, the repeat running durability, the electromagnetic characteristic, the gloss degree of the surface and the curling which are superior to those of the conventional ones.

We claim:

1. A magnetic recording medium having a substrate coated with a magnetic layer which comprises a binder and a magnetic powder, said binder in the magnetic layer comprising 40 to 70 wt. % of a urethane resin, 15 to 40 wt. % of a thermosetting epoxy resin characterized by its content of epoxide groups, and 10 to 40 wt. % of a thermoplastic phenoxy resin characterized by its content of polyhydroxyether groups.

2. A magnetic recording medium according to claim 1 which is a magnetic recording tape.

3. A magnetic recording medium according to claim 1 which is a magnetic recording disc.

4. A magnetic recording medium according to claim 1 wherein a curing agent is incorporated at a ratio of 8 to 20 wt. parts based on 100 wt. parts of the binder.

5. A magnetic recording medium according to claim 4 wherein the curing agent is a polyisocyanate.

* * * * *